US008607066B1

(12) United States Patent
Kailash et al.

(10) Patent No.: US 8,607,066 B1
(45) Date of Patent: Dec. 10, 2013

(54) CONTENT INSPECTION USING PARTIAL CONTENT SIGNATURES

(75) Inventors: Kailash Kailash, San Jose, CA (US);
Robert L. Voit, Los Angeles, CA (US);
Jose Raphel, Austin, TX (US)

(73) Assignee: Zscaler, Inc., San Jose, CA (US)

( * ) Notice: Subject to any disclaimer, the term of this patent is extended or adjusted under 35 U.S.C. 154(b) by 606 days.

(21) Appl. No.: 12/185,539

(22) Filed: Aug. 4, 2008

(51) Int. Cl.
*G06F 11/30* (2006.01)
*G06F 12/14* (2006.01)

(52) U.S. Cl.
USPC ............................................................ 713/188

(58) Field of Classification Search
USPC ............................................................ 713/188
See application file for complete search history.

(56) References Cited

U.S. PATENT DOCUMENTS 6,609,097 B2 * 8/2003 Costello et al. ............... 704/500
6,633,244 B2 * 10/2003 Avery et al. .................... 341/60
7,246,369 B1 * 7/2007 Duan et al. .................... 725/115
7,783,773 B2 * 8/2010 Wu et al. ....................... 709/231
8,010,469 B2 * 8/2011 Kapoor et al. .................. 706/20
2002/0129140 A1 * 9/2002 Peled et al. .................... 709/224
2002/0152389 A1 * 10/2002 Horita et al. .................. 713/180

* cited by examiner

*Primary Examiner* — Kambiz Zand
*Assistant Examiner* — Stephen Sanders
(74) *Attorney, Agent, or Firm* — Clements Bernard PLLC; Lawrence A. Baratta, Jr.; Christopher L. Bernard

(57) ABSTRACT

Systems, methods and apparatus for a content item inspection. A plurality of portions of a content item are received in a buffer, the buffer divided into a plurality of segments. A partial signature of the content item is computed using the received portions of the content item in a most recently received segment and a partial signature computed for a preceding segment. The computed partial signature is compared against a plurality of partial signatures associated with trustworthy content items. If a matching partial signature associated with a trustworthy content item is found for the computed partial signature, the most recently received segment is allowed to be transmitted to a device that requested the content item.

20 Claims, 6 Drawing Sheets

US 8,607,066 B1

CONTENT INSPECTION USING PARTIAL CONTENT SIGNATURES

BACKGROUND

This disclosure relates to content analysis and inspection.

Data inspection engines, such as virus scanners and spyware scanners, operate on content, such as files and file streams. When a security system is required to inspect content items for many users, such as thousands or tens of thousands of users, these data inspection engines are typically used in two modes of operation: (i) buffering each entire content item to be examined and submitting the content item to a data inspection engine for security processing; or (ii) submitting part of the content item in a content stream for inspection and maintain a scanning state for each content stream. The first mode of operation requires significant memory resources and significantly increases response time, such as in the case when the content item is a large file. The second mode requires associations of multiple streams for a content item with scanning states. This often results in the maintenance of multiple states and multiple streams.

To avoid the executing a data inspection process each time a content item is encountered, a signature (e.g., checksum) of the content item can be checked to determine if it matches a signature of a previously scanned content item. The response time for the processing of some content items can be improved as the content item inspection can be avoided if the signature of the content item matches a signature of previously scanned content item. However, full buffering of the content item to compute the signature of the content item is required, which increases memory resources and response time.

Winnowing is another process that can be used to avoid execution of a data inspection process each time a content item is encountered. Winnowing divides the content item into a number of fixed length segments. For each fixed length segment, the signature of the segment is computed and compared to a previously computed signature for the segment of a previously scanned content item. If all the signatures match, then content inspection can be avoided. Though the winnowing method can be used to inspect partial content (i.e., before the content item has completely been received), the amount of signature computation to be done is too large resulting in significant increases in user visible response time. In addition, winnowing identifies patterns in the file stream, which may be common to files having malware and files not having malware. This may result in false positives for a given file stream, resulting in unnecessary content inspection.

SUMMARY

In general, one aspect of the subject matter described in this specification can be embodied in methods that include the actions of receiving a plurality of portions of a content item in a buffer, the buffer divided into a plurality of segments; computing a partial signature of the content item, the computed partial signature computed using the received portions of the content item in one of the plurality of segments and a partial signature computed for a the immediately preceding segment; comparing a computed partial signatures against a plurality of partial signatures associated with trustworthy content items to find a matching partial signature; and if a matching partial signature is found for the computed partial signature, allowing the portions of the content item in the segment used to compute the matching partial signature to transmit. Other implementations of this aspect include corresponding systems, apparatus, and computer program products.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 4b is a flow diagram of an example process flow for classifying content items using the finite state machine of FIG. 4a.

Like reference numbers and designations in the various drawings indicate like elements.

DETAILED DESCRIPTION

Figure 1:
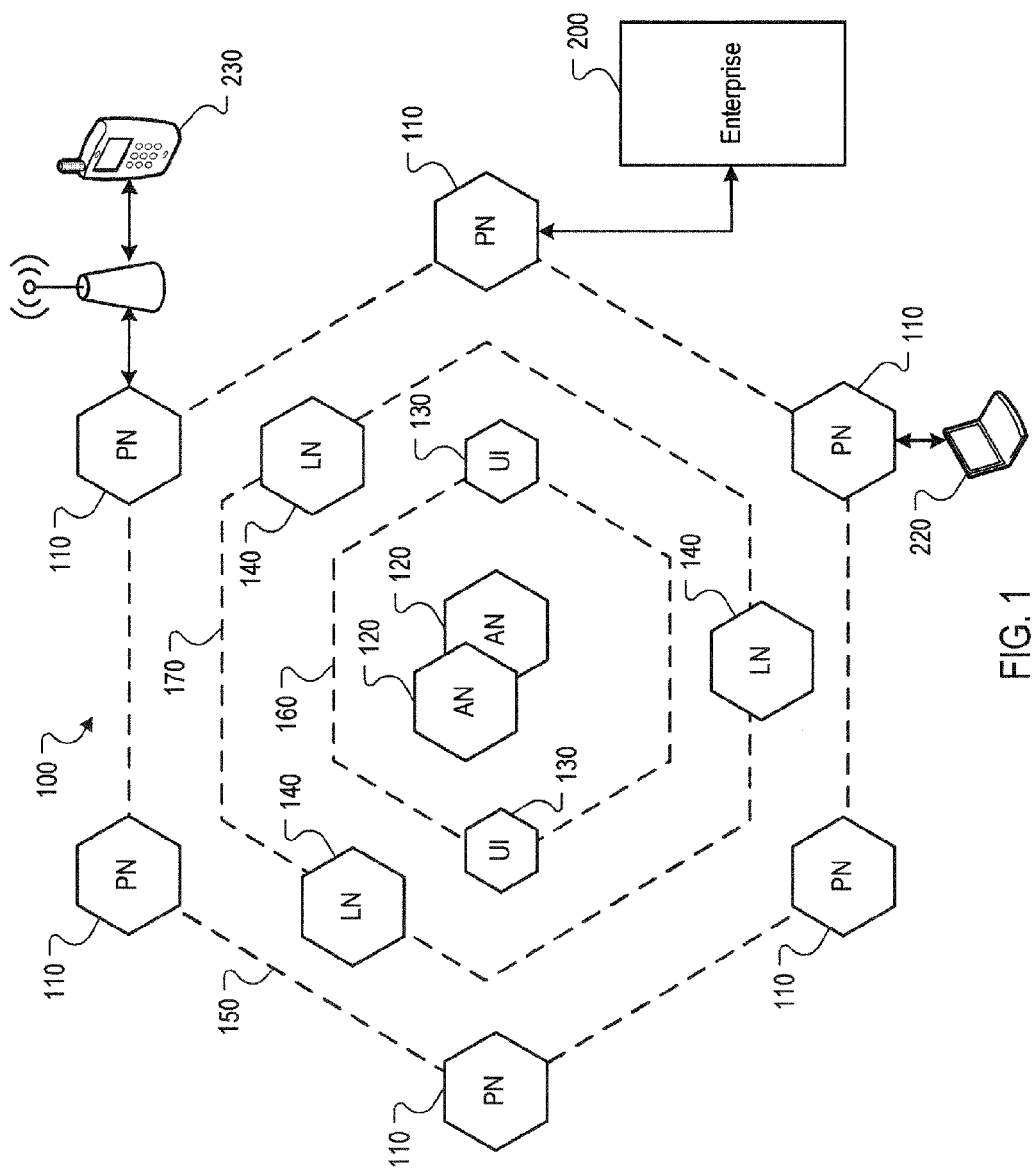
FIG. 1 is a block diagram of a distributed security system.

FIG. 1 is a block diagram of a distributed security system 100. The system 100 can, for example, be implemented as an overlay network in a wide area network (WAN), such as the Internet. The system 100 includes content processing nodes 110 that detect and preclude the distribution of security threats, e.g., malware, spyware, and other undesirable content sent from or requested by an external system. External systems may use the inspection service of the distributed security system 100. Example external systems can include an enterprise 200, a computer device 220, and a mobile device 230, or other network and computing systems.

§1.0 Example High Level System Architecture

In an example implementation, each processing node 110 can include a decision system, e.g., data inspection engines that operate on a content item, e.g., a Web page, a file, an e-mail message, or some other data or data communication that is sent from or requested by a user of one of the external systems. In some implementations, all data destined for or received from the Internet is processed through a processing node 110. In other implementations, specific data specified by each external system, e.g., only e-mail, only executable files, etc., is process through a processing node 110.

Each processing node 110 can analyze content items to determine a threat classification, e.g., clean, spyware, malware, undesirable content, innocuous, unknown, etc. For example, the determinations can be based on the output of one or more data inspection engines. In some implementations, the processing node 110 may compute partial signatures on a content item as portions of the content item are received in a buffer. In some implementations, a partial signature is generated each time a portion of the content item is received, and the partial signature is based on the received portion and any previously received portions. If the partial signature computed from the portion(s) of the content item in the buffer matches against known good partial signatures (i.e., the partial signatures that were computed from content items known to be not malware, spyware, etc.), then the received portion of the content item used to compute the partial signature is allowed to transmit to the requestor of the content item. In this way, each portion of a content item received in a buffer can be sent to the requestor as it is verified.

If, however, a partial signature does not match against a known good partial signature then that portion of the content item in the buffer, and portions of the content item received thereafter, are not sent to the requesting device. Instead, the content item is sent to one or more inspection engines for threat classification. Thereafter, if the content item is not classified as a threat by the data inspection engines, then the partial signatures of the content item are added to the known good partial signatures, and the content item is allowed to transmit to the requestor of the content item. Conversely, if the content item is classified as a threat, then the URL (or other similar identifier) of the offending content may be noted and the future requests for this content item are blocked.

Each processing node 110 can be implemented by a computer and communication devices, e.g., server computers, gateways, switches, etc. In some implementations, the processing nodes 110 can serve as an access layer 150. The access layer 150 can, for example, provide external system access to the security system 100. In some implementations, each processing node 110 can include Internet gateways and one or more server computers, and the processing nodes 110 can be distributed through a geographic region, e.g., throughout a country. According to a service agreement between a provider of the system 100 and an owner of an external system, the system 100 can thus provide security protection to the external system at any location throughout the geographic region.

Data communications can be monitored by the system 100 in a variety of ways, depending on the size and data requirements of the external system. For example, an enterprise 200 may have multiple routers that are used to communicate over the Internet, and the routers may be configured to establish communications through the nearest (in traffic communication time) processing node 110. A mobile device 230 may be configured to communication to a nearest processing node 110 through any available wireless access device, such as an access point, or a cellular gateway. A single computer device 220, such as a consumer's personal computer, may have its browser and e-mail program configured to access the nearest processing node 110, which, in turn, serves as a proxy for the computer device 220. Alternatively, an Internet provider may have all of its customer traffic processed through processing nodes 110.

In some implementations, the processing nodes 110 can communicate with one or more authority nodes 120. The authority nodes 120 can store policy data for each external system and can distribute the policy data to each processing node 110. The policy data can, for example, define security policies for a protected, system, e.g., security policies for the enterprise 200. Example policy data can define access privileges for users, Web sites and/or content that is disallowed, restricted domains, etc. The authority nodes 120 can distribute the policy data to the access nodes 110.

In some implementations, the authority nodes 120 can also distribute threat data that includes the classifications of content items according to threat classifications, e.g., a list of known viruses, a list of known malware sites, spam e-mail domains, etc. The distribution of threat data between the processing nodes 110 and the authority nodes 120 can be implemented by push and pull distribution schemes, or by other distribution schemes. Threat data may further include identifiers (e.g., URLs) of content items known to be threats (e.g., contain malware, spyware, and/or viruses) and partial signatures of content items previously scanned and determined to be clean or trustworthy.

In some implementations, each authority node 120 can be implemented by one or more computer and communication devices, e.g., server computers, gateways, switches, etc. In some implementations, the authority nodes 110 can serve as an application layer 160. The application layer 160 can, for example, manage and provide policy data, threat data, and data inspection engines and dictionaries for the processing nodes.

Other application layer functions can also be provided in the application layer, such as a user interface front-end 130. The user interface front-end 130 provides a user interface through which users of the external systems can provide and define security policies, e.g., whether e-mail traffic is to be monitored, whether certain Web sites are to be precluded, etc.

Another application capability that can be provided through the user interface front-end 130 is security analysis and log reporting. The underlying data on which the security analysis and log reporting functions operate are stored in logging nodes 140, which serve as a data logging layer 170. Each logging node 140 can store data related to security operations and network traffic processed by the processing nodes 110 for each external system.

In some implementations, the processing node 110 may act as a forward proxy that receives user requests intended for external servers but addressed directly to the processing node 110. In other implementations, the processing node 110 may access user requests that are redirected to the processing node 110 in the transparent mode where the requestor is unaware of the redirection. A protected system, e.g., enterprise 200, can, for example, choose one or both of these modes. In another example, an enterprise gateway can be configured so that user requests are routed through the processing node 110 by establishing a communication tunnel between enterprise gateway and the processing node. For establishing the tunnel, existing protocols such as generic routing encapsulation (GRE), layer two tunneling protocol (L2TP), or IP security protocols may be used.

In another example, the processing nodes 110 can be deployed at Internet service provider (ISP) nodes. The ISP nodes can redirect subject traffic to the processing nodes 110 in a transparent proxy mode. Protected systems, such as the enterprise 200, can use a multiprotocol label switching (MPLS) class of service for indicating the subject traffic that is to be redirected.

In another transparent proxy mode example, a protected system, such as the enterprise 200, may identify a processing node 110 as a next hop router for communication with the external servers.

All the above are ways the user of the content inspection service may have requests for content redirected to an inspection service so the content may be inspected for safety before it is delivered.

§2.0 Example Detailed System Architecture and Operation

Figure 2:
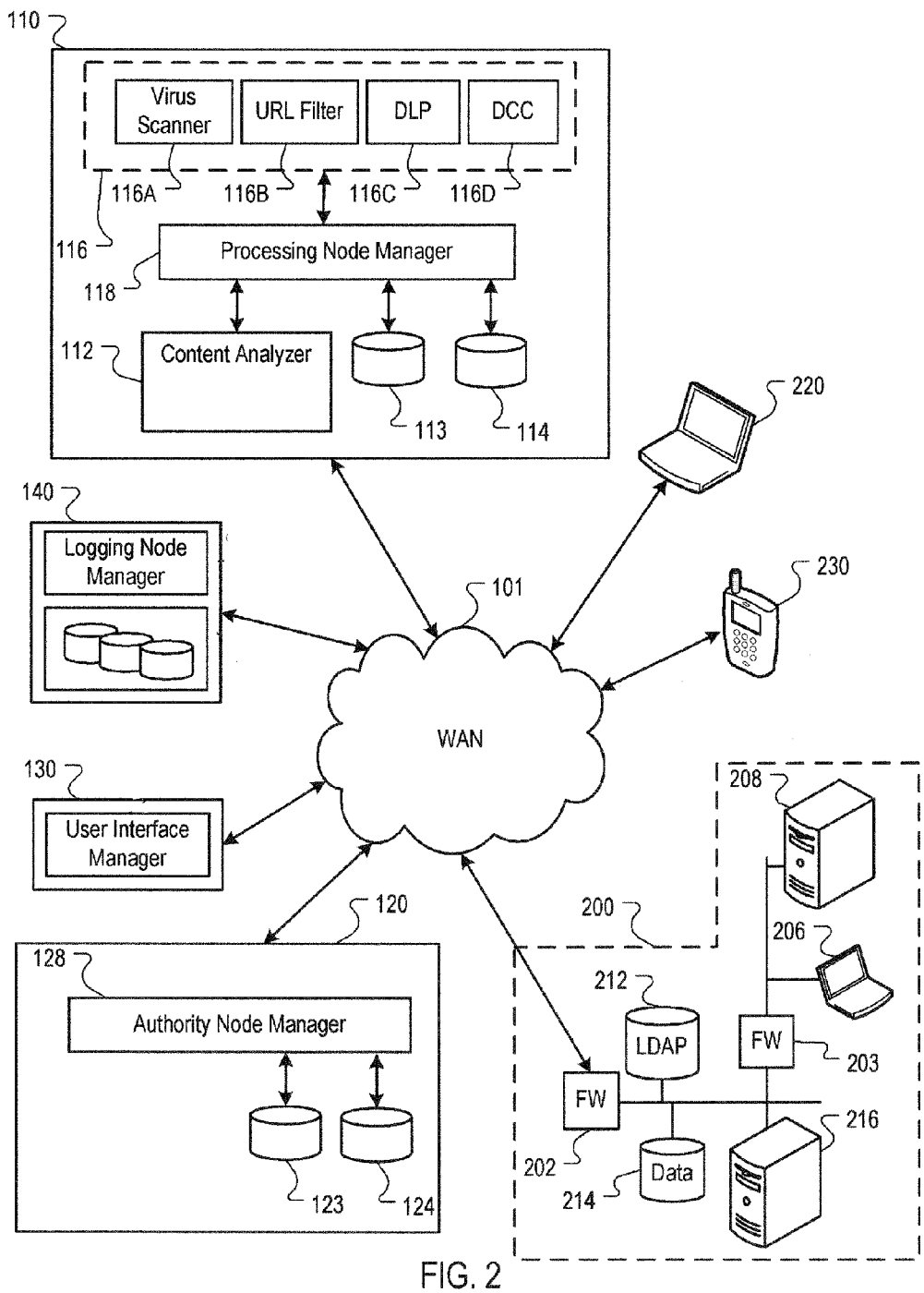
FIG. 2 is a block diagram of the system of FIG. 1 in which the components of FIG. 1 are illustrated in more detail.

FIG. 2 is a block diagram of the system of FIG. 1 in which the components of FIG. 1 are illustrated in more detail. Although only one representative component processing node 110, authority node 120 and logging node 140 are illustrated, there can be many of each of the component nodes 110, 120 and 140 present in the system 100.

A wide area network (WAN) 101, such as the Internet, or some other combination of wired and/or wireless networks, connects in data communication the processing node 110, authority node 120 and logging node 140. The external systems 200, 220 and 230 likewise communicate over the WAN 101 with each other or other data providers and publishers. Some or all of the data communication of each of the external systems 200, 220 and 230 can be processed through the processing node 110.

FIG. 2 also shows the enterprise 200 in more detail. The enterprise 200 can, for example, include a firewall 202 protecting an internal network that can include one or more enterprise servers 216, a lightweight director access protocol (LDAP) server 212, and other data or data stores 214. Another firewall 203 can protect an enterprise subnet that can include user computers 206 and 208 (e.g., laptop and desktop computers). The enterprise 200 may communicate with the WAN 101 through one or more network devices, such as a router, gateway, etc. The LDAP server 104 may store, for example, user login credentials for registered users of the enterprise 200 system. Such credentials can include a user identifiers, login passwords, and a login history associated with each user identifier. The other data 214 can include sensitive information, such as bank records, medical records, trade secret information, or any other information warranting protection by one or more security measures.

The computer device 220 and the mobile device 230 can also store information warranting security measures, such as personal bank records, medical information, and login information, e.g., login information to the server 216 of the enterprise 200, or to some other secured data provider server.

2.1 Example Processing Node Architecture

In some implementations, the processing nodes 110 are external to network edges of the external systems 200, 220 and 230. Each processing node 110 stores security policies 113 received from the authority node 120 and monitors content items requested by or sent from the external systems 200, 220 and 230. In some implementations, each processing node 110 can also include a content analyzer 112 and threat data 114 to facilitate the decision of whether a content item should be processed for threat detection.

A processing node manager 118 can manage each content item in accordance with the security policy data 113, the content analyzer 112 and/or threat data 114, if stored at the processing node 110, so that security policies for a plurality of external systems in data communication with the processing node are implemented external to the network edges for each of the external systems 200, 220 and 230. For example, depending on the classification resulting from the monitoring, the content item can be allowed, precluded, or threat detected. In general, content items that are already classified as "clean" or not posing a threat can be allowed, while those classified as "violating" or bad can be precluded.

The processing node 110 can include data inspection engines 116. Each data inspection engine 116 can be configured to perform a threat detection process to classify content items according to a threat classification for a corresponding threat. For example, the data inspection engines can include a virus scanner engine 116A that can classify a content item as infected or clean, a network URL filter 116B that can classify a URL address as allowed or restricted, a data leakage protection (DLP) engine 116C that can identify a content item as secure or leaking, and a dynamic content categorization (DCC) engine 116D that can classify a content item as passed or failed.

The list of the data inspection engines 116A-116D is illustrative only; many other data inspection engines 116 can also be used, as can multiple instances of data inspection engines, e.g., different type data leakage engines implementing different data leakage algorithms. The calling of any particular data inspection engine 116 can be predicated on the type of content item to be threat detected. For example, a URL request from the enterprise 200 may cause the processing node manager 118 to call only the URL filter engine 116B.

Because the amount of data being processed by the processing nodes 110 can be substantial, the content analyzer 112 can be used as the first stage of threat detection. The content analyzer 112 initially receives requests for content items from users and makes an initial determination based on the URL (or other identifier) as to threat classification of the content item (e.g., good, bad, or unknown). If the content item is classified as bad, the request for the content item is rejected or blocked. If the content item is classified as good or unknown, portions of the content items that are received from the content item provider (e.g., a download server) are examined by the content analyzer 112 and placed in a buffer.

As portions of the content item are received in the buffer, the content analyzer 112 computes partial signatures of the content item using the received portions in the buffer. In some implementations, the portions are defined byte increments or segments that are received. For example, a first partial signature may be computed from the first 100 bytes in the buffer, and a second partial signature may be computer from the first 1000 bytes in the buffer. The computed partial signatures may be compared against partial signatures included in the threat data 114 associated with content items previously determined to be clean or trustworthy. For example, the threat data 114 may include partial signatures of content items that were already processed by the data inspection engines 116. If a computed partial signature matches one of the stored partial signatures, i.e., the content item was previously received, scanned, and classified as good, then the portions of the content item in the buffer used to generate that partial signature may be allowed to transmit to the requesting user by the content analyzer 112. If a computed partial signature does not match one of the stored partial signatures in the threat data 114, then the received portions of the content item in the buffer, and any portions received thereafter, may be provided to one or more of the data inspection engines 116 for threat detection.

§2.2 Example Authority Node Architecture

In general, the authority node 120 includes a data store that stores master security policy data 123 for each of the external systems 200, 220 and 230. An authority node manager 128 can be used to manage the master security policy data 123, e.g., receive input from users of each of the external systems defining different security policies, and can distribute the master security policy data 123 to each of the processing nodes 110. The processing nodes 110 then store a local copy of the security policy data 113.

The authority node 120 can also store master threat data 124. The master threat data 124 can classify content items by threat classifications, e.g., a list of known viruses, a list of known malware sites, spam e-mail domains, etc. The master threat data 124 may contain identifiers (e.g., URLs) of content items that are known to be or contain viruses, malware, and/or spyware. The master threat data 124 may also contain partial signatures of content items that are known to clean or trustworthy. The authority node manager 128 can be used to manage the master threat data 124, e.g., receive updates from a processing nodes 110 when a processing node 110 has processed a content item and update the master threat data 124 with any pertinent results. For example, when one or more data inspection engines 116 at a processing node 110 determine that a content item is clean, computed partial signatures of the content item may be transmitted to the authority node 120 and used to update the master threat data 124. In some implementations, the master threat data 124 can be distributed to the processing nodes 110, which then store a local copy of the threat data 114.

In some implementations, the authority node 120 can also monitor the health of each processing node 110, e.g., the resource availability in each processing node 110, detection of link failures, etc. Based on the observed health of each process node 110, the authority node 120 can redirect traffic among processing nodes 110 and/or balance traffic among the processing nodes 110. Other remedial actions and processes can also be facilitated by the authority node 110.

§2.3 Example Processing Node and Authority Node Communications

The processing node 110 and the authority node 120 can be configured according to one or more push and pull processes to manage content items according to security policy data 113 and/or 123, content analyzer 112, and the threat data 114 and/or 124.

§3.0 Content Analyzer

Figure 3:
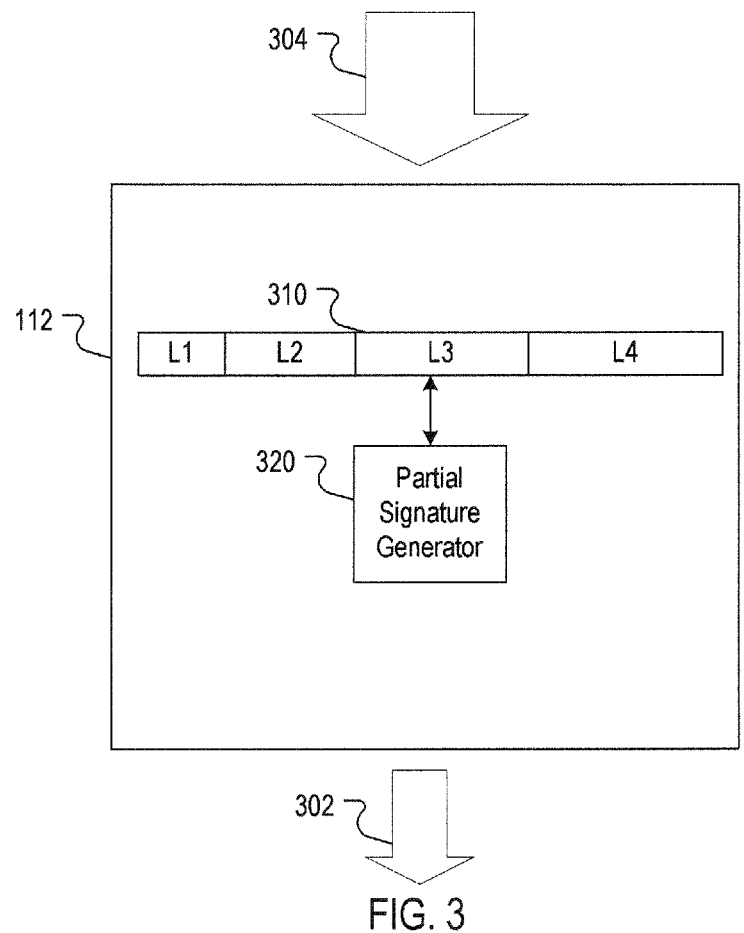
FIG. 3 is a block diagram of a content analyzer using partial signatures.

FIG. 3 is a block diagram of a content analyzer 112. The content analyzer 112 may compute a partial signature from a received content item segment, or alternatively, from the received segment together with a previously computed partial signature. The computed partial signatures are compared against known partial signatures in the threat data 114, and a determination of whether the content item is trustworthy, i.e., classified as good, may be made.

In some implementations, portions of content items are received by the content analyzer 112 through a connection 304. The connection 304 may represent a high bandwidth connection between a processing node 110 and an enterprise server 216, for example. Example connections 304 may have a bandwidth of 10G bits/sec or greater. Other bandwidths may also be used.

The content analyzer 112 may also transmit analyzed received portions of content items to requesting users through one or more connections 302. The connections 302 may represent a connection between the enterprise server 216 and one or more devices such as user device 206, for example. Connections 302 are often shared between many users and devices and are typically of a much lower bandwidth than the connections 304, and may include connections such as T-1, DSL, cable modem, etc. Example connections 302 may have a bandwidth of 100M bits/sec. Other bandwidths may also be used.

The content analyzer 112 may include a buffer 310. The buffer 310 may store received portions of a requested content items for analysis by the content analyzer 112. The optimal size used for the buffer may be determined based on the bandwidth size of the connections 304 and 302 relative to one another and the processing speed of the content analyzer 112. Because the bandwidth of the connection 304 is larger than the connection 302, portions of a requested content item cannot be sent to the requesting user over the connection 302 as fast as they are received over the connection 304. The difference is speeds between the two connections results in a bottleneck and portions of the content item may have to queue or wait to be sent over the connection 302 after they have been received over the connection 304. Because portions of the content item must wait to be transmitted over the connection 302, the size of the buffer 310 may be chosen such that content item portions may be analyzed from the buffer 310 according to the processing speed of the content analyzer 112 without adding any additional delay to the transmission of the content item portions that was not already created by the mismatch between the connections 302 and 304.

The content analysis engine 112 may further contain a partial signature generator 320. The partial signature generator 320 may compute partial signatures of content items using portions of the content item stored in the buffer 310. In some implementations, the partial signatures are cryptographically secure checksums. For example, the partial signatures may be MD5 checksums. Other techniques for computing partial signatures may also be used, such as CRC 64, for example.

In some implementations, the partial signature generator 320 may compute the partial signatures using defined segments (e.g., segments L1, L2, L3, and L4) in the buffer 310. After a segment fills with portions of the content item, the partial signature for the content item using that segment may be computed. As the partial signatures are generated, the partial signatures may be compared against the partial signatures in the threat data 114 that have been computed from content items that are known to be clean or trustworthy. Data from the incremental segments used to generate a partial signature that matches with a known content item may be forwarded to the requesting user over the connection 302. Data from the incremental segments used to generate a partial signature that is not matched may be sent, along with the other segments, to the data inspection engines 116 for inspection. Data from segments used to generate a partial signature for a content item that is classified as a threat or bad may be discarded.

In some implementations, the partial signature generator 320 may generate the partial signatures cumulatively using increasing numbers of segments. For example, the partial signature generator 320 may first compute a partial signature using segment L1. The partial signature generator may then compute a partial signature using L1+L2, for example. The partial signature generator 320 may further compute the partial signatures for a sequence of segments from the buffer 310 using previously computed partial signatures. For example, the partial signature for the content item using segments L2 and L1 may be computed from segment L2 and the previously computed partial signature using L1. Similarly, the partial signature for the content item using segments L1+L2+L3 may be computed using segment L3 and the partial signatures computed using L1 and L1+L2. By computing the partial signatures of the content item using previously computed partial signatures, the processing time to compute subsequent partial signatures may be reduced and any visible response degradation for the user may be minimized.

In some implementations, the partial signatures may be computed from the buffer 310 in segments of increasing byte length. For example, where the requested content item is a Web page, typically, the transmission rate used by a Web server when sending a requested Web page may increase as the transmitted portions of the Web page are received by the content analyzer 112. This results in the buffer 310 being initially filled slowly. Thus, the initial segments of the buffer 310 may be chosen to be small so the content analyzer 112 may compute an initial partial signature of the content item quickly based on the portions of the content item received so far in the first segment of the buffer 310. Subsequent segments in the buffer 310 may be larger because the rate at which the buffer 310 is filled may have increased. By increasing the size of the segments used to generate the partial signatures, the overall number of checksums computed may be reduced for a content item and the buffer 310 while minimizing visible response degradation for the user. For example, in some, implementations, L1 may be 1 MB, L2 may be 10 MB, L3 may be 100 MB, and L4 may be 1000 MB. However, other byte lengths may be chosen. In addition, a buffer 310 may contain more or fewer segments than illustrated by the buffer 310.

In some implementations, the segments sizes may be multiples of a sender window size such as 8K, 16K, 32K, 64K, 128K, 256K and so forth. Without packet loss on the network, a receiver may double the amount of data send within a round-trip-time (RTT). Because partial signature computation is typically orders of magnitude faster than a typical RTT, an initial small segment size may be chosen to minimize initial visible response degradation for the user while the first segment is filled. If the partial signature computed from the first 8K segment does not match a stored partial signature, then the contents of the buffer can be submitted for content inspection.

In other implementations, the partial signatures may be computed from the buffer 310 in segments of decreasing byte length. For example, where the content item is streaming video or audio content, initial response degradation for the requesting user in receiving the video stream may be more acceptable than periodic visible degradation delays during the streaming of the content item. Thus it may be acceptable for the content analyzer 112 to wait for the larger first segment to fill with data before computing the initial partial signature, because subsequent partial signature computations may be reduced resulting is less visible degradation delays during the streaming of the content item.

In some implementations, the size and number of segments may be determined by determining the average amount of time a piece of data, e.g., a packet, may have to typically wait between reception through the connection 304 and transmission through the connection 302. The size and number of segments selected may then be determined based on the processing resources available to the partial signature generator 320, such that the partial signature generator 320 may be able to generate partial signatures from the portions of the content item at a rate that is less than the average amount of time a typical packet waits between reception through the connection 304 and transmission through the connection 302. Generally, smaller segments result in faster partial signature calculation, while larger partial signatures may provide more accurate matches. Thus, it is desirable to increase the sizes of the segments in the buffer 310.

In some implementations, the overall size of the buffer 310 may be determined by the average amount of time a piece of data, e.g., a packet, may have to typically wait between reception through the connection 304 and transmission through the connection 302, and the average size of the content items requested. Where the average amount of time a piece of data may have to typically wait between reception through the connection 304 and transmission through the connection 302 is high, and the average size of the content item is high, a larger buffer 310 may be needed to avoid memory exhaustion. Similarly, where the average amount of time a piece of data may have to typically wait between reception through the connection 304 and transmission through the connection 302 is low, and the average size of the content item is low, a smaller buffer 310 may be needed to avoid memory exhaustion. In addition, the size of the buffer 310 may be further dependent on the available computing resources of the content analyzer 112.

Figure 4A:
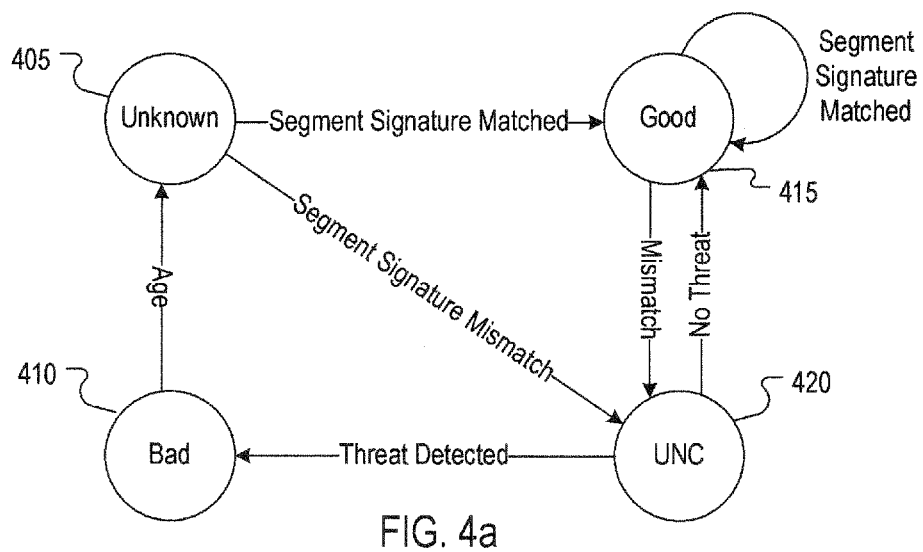
FIG. 4a is an illustration of a finite state machine for classifying content items.

FIG. 4a is an illustration of an example finite state machine implemented by the content analyzer 112 when classifying a particular content item. The finite state machine includes four classification states for a content item: unknown state 405; bad state 410; good state 415; and unclassified state 420.

The content analyzer 112 may receive a request for a content item and determine an initial classification state for the content item before allowing the content item to download. The initial determination of the classification state may be determined by the content analyzer 112 by referencing the URL or other identifier of the content item and comparing it against information in the threat data 114. If the received content item is known to be a threat (e.g., affiliated with spyware, malware, or a virus), then the content analyzer 112 may classify the content item in the bad classification state 410, and further receipt of the content item may be blocked or denied. In addition, the entry for the content item in the threat data 114 may be "aged" or scheduled to be removed from the threat data 114 resulting in a re-inspection by the data inspection engines 116 of the of the content item when a subsequent request for the content item is received. Aging the bad classification of the content item may allow content items that have been cleaned of spyware, malware or viruses to become available for download for users. Aging of the bad classification of the content item may result in the classification state of the content item changing to the unknown classification state 405. In some implementations, the amount of time before a particular content item is scheduled for removal by the content analyzer 112 may be a function of the number of times the content item 112 has been previously classified in the bad state 410.

If, based on the URL or other identifier, a content item is determined to be good by the content analyzer 112 using the threat data 114, then the content analyzer 112 may classify the requested content item in the good state 415. When the content analysis state is the good state 415, then, as portions of the content item are received, they are placed in the buffer 310. In referring to the portion of a content item that has been received and placed into the buffer, contiguous pieces thereof are referred to as segments. As these segments are filled, the partial signature generator 320 may generate a signature for each segment. Depending on the mode of operation, this partial signature may either be a signature computed entirely from the contents of the segment, or alternatively it may be a signature that incorporates not only the current segment but also depends upon the previous segments, possibly by considering the signature of the immediately preceding segment together with the data of the current segment when generating the current partial signature.

The generated signature for a segment is compared against previously computed segment signatures for known trustworthy content items in the threat data 114. If the generated segment signature matches a segment signature associated, with a known trustworthy content item, the content item may remain classified in the good state 415 and the contents of the segment in the buffer 305 that were used to generate the matching signature are allowed to transmit to the requesting user. If a generated signature does not match a signature associated with a known trustworthy content item, the content item may be reclassified into the unclassified state 420.

If a request content item has never been seen before as indicated by the threat data 114, the content item may be classified in the unknown state 405. In the unknown state 405, portions of the content item are received and placed in the buffer 310. The partial signature generator 320 may generate a signature of the content item from the portions in a segment of the buffer 310. The generated signature is compared against previously computed signatures for known trustworthy content items in the threat data 114. If the generated signature matches a signature associated with a known trustworthy content item, the content item may be reclassified into the good state 415 and the contents of the segment in the buffer 305 that were used to generate the matching signature are allowed to transmit to the requesting user.

If a non matching partial signature is generated, the content item may be classified into the unchecked state 420. In the unchecked state 420 the portions of the content item in the buffer 310, and subsequently received portion of the content item are sent to the data inspection engines 116 for threat detection. If a threat is detected in the content item (e.g., the content item contains malware, spyware, or a virus), then no further portions of the content item are transmitted to the requesting user, and the content item may be classified into the bad state 410. If no threat is detected for the received content item, then the signatures of the content item may be calculated and added to the threat data 114 as signatures associated with a known trustworthy content item. The content item may be classified into the good state 415 and the content item is allowed to be transmitted to the requesting user.

§4.0 Example Processes for Content Analysis

Figure 4B:
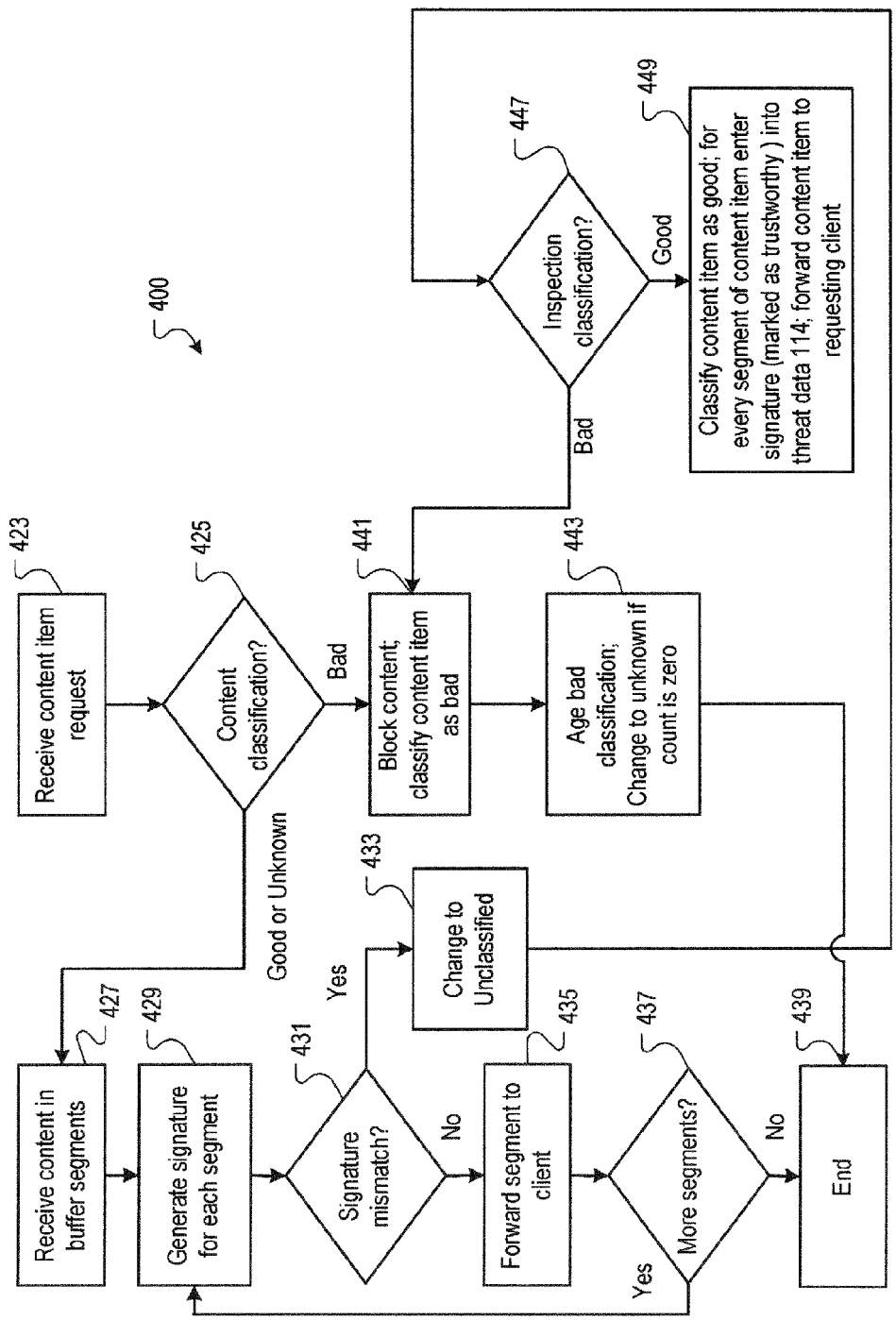

FIG. 4b is a flow diagram of an example process flow for classifying content items using the finite state machine of FIG. 4a, or other software and/or hardware devices. The process 400, can for example, be implemented in the content analyzer 112 of the processing node 110, for example.

A request for a content item is received (423). In some implementations, a request for a content item is received from a client device in communication with a processing node 110. The request may be received by a content analyzer 112 at the processing node 110. For example, the content item request may be a Web page. The content analyzer 112 may be implementing a finite state machine as illustrated in FIG. 4a to classify the content item.

An initial determination based on the URL or other identifier naming the requested source, may be made as to the classification of the requested content item (425). The content analyzer 112 may determine the classification using the threat data 114. For example, the threat data 114 may indicate if the content item was previously inspected by one of the data inspection engines 116 and was found to be clean or trustworthy, or if the content item was found to be bad or untrustworthy because it included spyware, malware, viruses, or other threats. If the content item was previously inspected and found clean or there is no record of the content item being inspected, the content analyzer 112 may classify the content item in the good state 415 or the unknown state 405 respectively and the requested content item may begin to be received into segments of the buffer 310 (427). If the content item was previously inspected and found to be bad, then the content analyzer 112 may classify the content item in the bad state 410, and the content item may be blocked from downloading (441).

After receiving a portion or portions of the content item in the segments of the buffer 310 (427), a signature is generated for each segment of the recently buffered segments in the buffer 310 (429). In some implementation, the signature may be generated by the partial signature generator 320. The generated signature may then be compared with signatures generated from the segments of known trustworthy content items (431). The signatures generated from trustworthy content items may be part of the threat data 114. If a segment's signature matches one of the trustworthy segment signatures from the threat data 114, the contents of the segment in the buffer 310 used to generate the segment's signature may be forwarded to the requesting client (435). In addition, if the content item is classified in the unknown state 405 it may be reclassified into the good state 415. If the partial signature does not match, the content analyzer 112 may classify the content item into the unclassified state 405 (433) and the received portion of the content item, and any subsequent portions of the received content item are sent to the data inspection engines 116 for data inspection (447).

A determination is made if additional segments of the buffer 310 are filled with portions of the received content item (437). If additional segments of the buffer 310 of are filled (i.e., more of the content item has been received), the partial signature generator 320 may generate an additional signature from the next filled segment and the signature from the previous segments(429). If no additional segments are full (i.e., the content has been completely received), the process 400 may end (439).

If content was classified as unclassified, then the received portions of the content item are inspected (447). In some implementations, the content item may be inspected by one or more of the data inspection engines 116, for example.

If the content item passes inspection by the data inspection engines 116 (i.e., does not contain malware, spyware, or viruses), the content analyzer 112 may classify the content item into the good state 405, and the content item may be forwarded to the requesting client (449). In addition, signatures for the content item may be computed and stored in the threat data 114 as signatures matching trustworthy content items.

If the content item does not pass inspection by the data inspection engines 116, the content item may be classified into the bad state 410 and the content item may be blocked from transmitting to a user by the content analyzer 112 (441). In addition, the URL (or other identifier) of the content item and the last computed signature for the content item may be stored in the threat data 114 as a partial signature matching a non-trustworthy content item. Future content matching this signature may be classified as bad without passing to the data inspection engines 116, for example.

After the URL associated with a content item is blocked (441), the bad state 410 classification of the URL's content item may be aged to determine if the content item should be reclassified in the unknown state 405 (443). For example, a content item may have been previously determined by the data inspection engines to contain spyware. However, the content item may no longer contain spyware, and should, therefore be re-inspected by the data inspection engines 116. In some implementations, the content analyzer 112 may age a bad classification of a content item by decrementing an age count associated with the content item in the threat data 114 each time the content item is requested, for example. If the age count reaches zero, the content item is classified in the unknown state 405, and the content item may be re-inspected on a subsequent request by a user. In some implementations, each time a content item is re-inspected by the data inspection engines 116, the age count is set to a higher and higher value, increasing the number of times the content item must be requested before it is re-inspected. The process 400 may then end (439).

Figure 5:
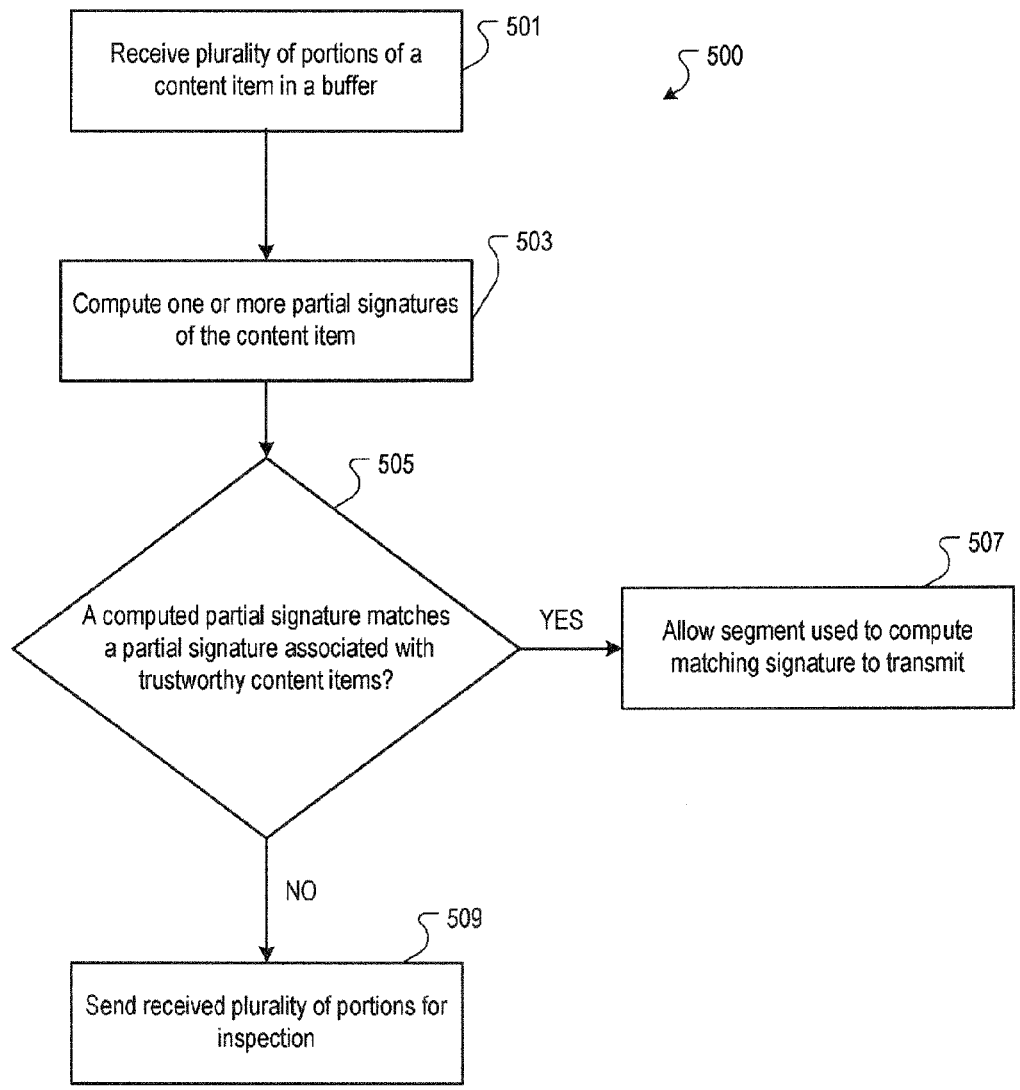
FIG. 5 is a flow diagram of an example process for classifying content using partial signatures.

FIG. 5 is a flow diagram of an example process 500 for providing content item analysis. The process 500 can, for example, be implemented in the content analyzer 112 of the processing node 110, for example.

Portions of a content item are received in a buffer (501). In some implementations, the portions of a content item are received by the content analyzer 112 in a buffer 310. The portions of a content item may have been received in response to a request for the content item by a user. For example, the content item may be a Web page. A user associated with an external system (e.g., enterprise 200) may have requested the Web page using a browser. As a result, portions of the content item may have started to download to the processing node 110 associated with the enterprise server 200 where they have been received by the content analyzer 112 for a content analysis.

A partial signature of the content item is computed (503). In some implementations, a partial signature may be computed by the partial signature generator 320 of the content analyzer 112. The partial signature may be computed for a segment included in the buffer 310. In some implementations, a partial signature may be computed using the data from the segment and a computed partial segment of the segment that precedes it in the buffer, if any. For example, a first partial signature may be computed using the buffer segment containing the first 10 MB of the content item. A second partial signature may be computed using the buffer segment containing the next 90 MB and the first computed partial signature. In some implementations, the signature may be a cryptographically secure checksum, such as an MD5 checksum. However, other types of signatures may be used.

A determination is made as to whether the computed partial signature matches a partial signature associated with trustworthy content items (505). In some implementations, the content analyzer 112 may determine if the computed partial signature matches a partial signature stored in the threat data 114. For example, the threat data 114 may include partial signatures of content items that have been previously determined by one or more of the threat detection engines 116 to be trustworthy (i.e., free from spyware, malware, viruses, etc.). If the computed partial signature matches one of the partial signatures associated with trustworthy content items, then the content analyzer 112 may allow the received portions of the content item from the segment used to generate the matching partial signature to transmit to the user who requested the content item (507).

If the computed partial signature does not match a partial signature associated with a trustworthy content item, the content analyzer 112 may send the received segments for threat inspection (509). The content analyzer 112 may send the portions for inspection at one or more of the data inspection engines 116. In addition, any further portions of the content item received may be sent by the content analyzer 112 to the data inspection engines 116 for inspection.

Figure 6:
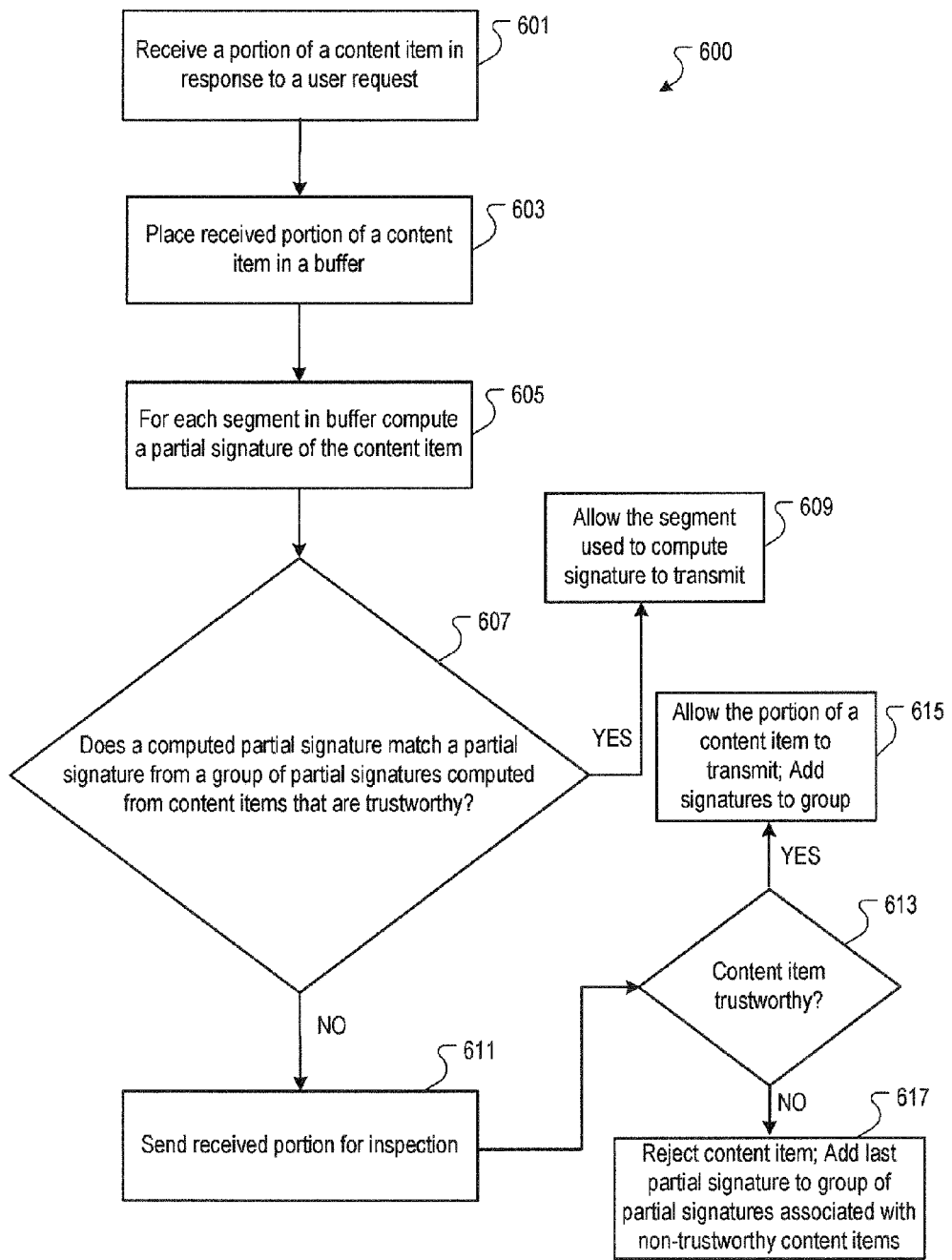
FIG. 6 is a flow diagram of an example process for providing content item analysis.

FIG. 6 is a flow diagram of an example process 600 for providing content item analysis. The process 600 can, for example, be implemented in the content analyzer 112 of the processing node 110, for example.

A portion of a content item is received in response to a user request (601). The portion of a content item may be processed by the content analyzer 112 of a processing node 110.

The received portion of the content item is placed in a buffer (603). In some implementations, the received portion of the content item may be placed in a buffer such as the buffer 310 by the content engine. The buffer 310 may be divided into segments. In some implementations, each segment may be larger than the previous segment. For example, a first segment may include 1 MB of the buffer 310, a second segment may include the next 9 MB of the buffer 310, and a third segment may include the next 90 MB of the buffer 310. Other segments sizes and numbers may also be used.

A partial signature is computed for the content item for each segment in the buffer (605). The partial signatures may be computed by the partial signature generator 320. In some implementations, each partial signature is generated using the data in the segments along with partial signatures of computed for preceding segments in the buffer 310.

A determination is made as to whether a computed partial signature matches a partial signature from a group of partial signatures computed from content items that are trustworthy (607). The content analyzer 112 may match a computed partial signature against a group of partial signatures computed from content items that are trustworthy stored in the threat data 114. By comparing against partial signatures that are trustworthy, rather than untrustworthy, false matches may be avoided with untrustworthy content items. For example, an untrustworthy content item containing a virus may include several segments of zeros. Content items that are trustworthy may also include several segments of zeros. A partial signature generated from the trustworthy content item containing the segment of zeros may match a partial signature of the untrustworthy content item also containing the zeros, which would result in the blocking of a content item that is otherwise safe.

If it is determined that a computed partial signature matches a partial signature from the group of trustworthy partial signatures, the data from the segment used to compute the partial signature is allowed to transmit to the user (609). If it is determined that a computed partial signature does not match a partial signature from the group of trustworthy content items, the received portion of the content item is sent for threat inspection to determine if the content item is trustworthy (611).

A determination is made as to whether the content item is trustworthy (613). The determination may be made by the data inspection engine 116, for example. If it is determined that the content item is trustworthy, the content item is allowed to transmit to the user and the computed partial signatures for the content item are added to the group of partial signatures computed from items that are trustworthy (615). If it is determined that the content item is not trustworthy, the content item is not allowed to transmit to the user and subsequent requests for the content item from the user may be blocked by the content analyzer 112 (617). In addition, the signature of the entire content item, with the notation untrustworthy, is added to the threat data 114 (which data is periodically merged into treat data 124 and distributed to the threat data 114 held by other processing nodes 110). Adding the signature of the entire content item (rather than the partial signatures) to the threat data 114 may allow the content analyzer 112 to determine if a content item is untrustworthy before sending the content item to one of the inspection engines 116 (e.g., virus detection engine 116A). If the signature of an entire content item matches a stored non-trustworthy signature, then the transmission of the content item may be blocked and inspection by the slower inspection engines 116 is avoided.

Embodiments of the subject matter and the functional operations described in this specification can be implemented in digital electronic circuitry, or in computer software, firmware, or hardware, including the structures disclosed in this specification and their structural equivalents, or in combinations of one or more of them.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A method comprising:
    receiving, at a server in a distributed security system, a plurality of portions of a content item stored in a buffer, the buffer divided into a plurality of segments, wherein a size of the plurality of segments relative to one another is selected based on a data type of the content item by selecting increasing segment lengths for Web page traffic and decreasing segment lengths for streaming traffic minimizing degradations to end users of the distributed security system;
    computing a partial signature of the content item using the received portions of the content item in a most recently received segment and a partial signature computed for a preceding segment, wherein the partial signature is computed in a cumulative manner using the preceding segment;
    comparing the computed partial signature against a plurality of partial signatures associated with trustworthy content items based on spyware, malware, viruses, and threats; and
    if a matching partial signature associated with a trustworthy content item is found for the computed partial signature, allowing the plurality of portions of the content item to be transmitted to a device that requested the content item, wherein the plurality of portion are transmitted to the device as received by the server.

2. The method of claim 1, further comprising sending the received plurality of portions of the content item in the buffer for inspection if a matching partial signature associated with a trustworthy content item is not found for the computed partial signature.

3. The method of claim 2, wherein sending the received plurality of portions of the content item for inspection comprises sending the received plurality of portions of the content item for malware inspection.

4. The method of claim 1, further comprising:
    comparing the last computed partial signature against a plurality of signatures associated with not trustworthy content items; and
    if a matching signature associated with a not trustworthy content item is found for the last computed partial signature, not allowing the most recently received segment to be transmitted to a device that requested the content item.

5. The method of claim 4, further comprising aging the not trustworthy content item associated with the matching partial signature.

6. The method of claim 5, wherein aging the not trustworthy content item comprises decrementing a count value associated with the not trustworthy content item.

7. The method of claim 6, further comprising determining if the count value is less than a threshold value, and deleting the signature of the not trustworthy content item if the count value is less than a threshold value.

8. The method of claim 6, wherein the count value is based on the number of times the not trustworthy content item was determined to be not trustworthy.

9. The method of claim 1, wherein the partial signature is a cryptographic partial signature.

10. The method of claim 1, wherein the partial signature is an MD5 partial signature.

11. The method of claim 1, wherein the content item is a Web page.

12. The method of claim 1, further comprising determining if the content item is not trustworthy and computing one or more partial signatures of the content item only if it is not determined that the content item is not trustworthy.

13. The method of claim 1, wherein each segment is larger than a preceding segment.

14. The method of claim 1, wherein each segment is smaller than a preceding segment.

15. A non-transitory computer-readable medium with computer-executable instructions stored thereon and executable by a processing system that is part of a distributed security system and operable to cause the processing system upon such execution to perform operations comprising:
    receiving a portion of a content item, the content item received in response to a request from a user device;
    placing the received portion of a content item in a buffer, the buffer comprising a plurality of segments, wherein a size of the plurality of segments relative to one another is selected based on a data type of the content item by selecting increasing segment lengths for Web page traffic and decreasing segment lengths for streaming traffic minimizing degradations to end users of the distributed security system;
    computing a partial signature of a first segment;
    for each of the plurality of segments in the buffer subsequently received after the first segment:
        computing a partial signature of the content item using the subsequent segment and a computed partial signature of the segments that precede the subsequently received segment, wherein the partial signature of the content item is computed in a cumulative manner using the segments that precede the subsequently received segment;
        determining if the computed partial signature matches a partial signature from a group of partial signatures computed from content items that are trustworthy based on spyware, malware, viruses, and threats; and if it is determined that a computed partial signature matches a partial signature from the group of partial signatures computed from content items that are trustworthy, allowing the subsequently received segment used to compute the partial signature to transmit to the user device, wherein the subsequently received segment is transmitted to the user device as received by the processing system.

16. The computer-readable medium of claim 15, further comprising:

if it is not determined that a computed partial signature matches a partial signature from the group of partial signatures computed from content items that are trustworthy, sending the received portions of the content item to a inspection process to determine if the content item is trustworthy.

17. The computer-readable medium of claim 16, wherein the inspection process is a malware detection process.

18. The computer-readable medium of claim 15, wherein the partial signature is a cryptographic partial signature.

19. The method of claim 1, further comprising:

using a state machine to classify the content item;

updating the state machine based on results of the comparing step for the computed partial signature; and repeating the computing and comparing steps for a next segment of the plurality of segments.

20. A system, comprising:

a node in a distributed security system comprising:

a buffer receiving a content item from a network, wherein the buffer is sized based on a bandwidth size of the network; and a processor communicatively coupled to the buffer and configured to perform the steps of:

dividing the content item into a plurality of segments, wherein a size of the plurality of segments relative to one another is selected based on a data type of the content item by selecting increasing segment lengths for Web page traffic and decreasing segment lengths for streaming traffic minimizing degradations to end users of the distributed security system;

for each of the plurality of segments, computing a partial signature for a current segment, the partial signature comprises the partial signature of the current segment and the partial signature of all previous segments in a cumulative manner;

comparing the partial signature for the segment against a plurality of partial signatures associated with trustworthy content items based on spyware, malware, viruses, and threats;

if there is a signature mismatch based on the comparing, inspecting the content item to determine if it is a threat; and if there is not a signature mismatch, forwarding the current segment as received.

* * * * *